(12) United States Patent
Luu et al.

(10) Patent No.: US 8,130,137 B1
(45) Date of Patent: Mar. 6, 2012

(54) TEMPLATE UPDATED BOOST ALGORITHM

(75) Inventors: Thu-Van Luu, Lumberton, NJ (US);
Jeffrey B. Boka, Lumberton, NJ (US);
Purusottam Mookerjee, Bridgewater, NJ (US); Michael J. Harcourt, Sicklerville, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 803 days.

(21) Appl. No.: 11/868,554

(22) Filed: Oct. 8, 2007

Related U.S. Application Data (63) Continuation-in-part of application No. 11/189,234, filed on Jul. 26, 2005, now abandoned.

(51) Int. Cl.
*G01S 13/66* (2006.01)
*G01S 13/88* (2006.01)
*F42B 15/01* (2006.01)
*G01S 13/00* (2006.01)
*F42B 15/00* (2006.01)

(52) U.S. Cl. .......... 342/62; 701/1; 701/3; 89/1.11; 244/3.1; 244/3.11; 244/3.14; 244/3.15; 244/3.19; 342/61; 342/73; 342/74; 342/75; 342/76; 342/89; 342/90; 342/104; 342/118; 342/146; 342/147; 342/175; 342/195

(58) Field of Classification Search .......... 89/1.11; 342/27, 28, 59, 61–68, 73–103, 104–115, 342/165–175, 195, 118, 146, 147, 158; 701/3–18; 703/6, 7, 8; 244/3.1–3.3
See application file for complete search history.

(56) References Cited

U.S. PATENT DOCUMENTS

| | | | |
|---|---|---|---|
| 3,116,039 A | | 12/1963 | Goldberg |
| 3,156,435 A | | 11/1964 | Edward et al. |
| 3,164,339 A | | 1/1965 | Schroader et al. |
| 3,169,727 A | | 2/1965 | Schroader et al. |
| 3,206,143 A | | 9/1965 | Von Munchihofen |
| 3,527,167 A | | 9/1970 | Morse |
| 3,560,971 A | * | 2/1971 | Alsberg et al. ............ 244/3.14 |
| 3,706,096 A | * | 12/1972 | Hammack ............... 342/107 |
| 3,741,501 A | | 6/1973 | Salkeld |
| 3,741,502 A | | 6/1973 | Schroader et al. |
| 3,883,091 A | | 5/1975 | Schaefer |
| 3,951,359 A | | 4/1976 | Willhite |

(Continued)

FOREIGN PATENT DOCUMENTS

WO 98/58274 A1 12/1998

OTHER PUBLICATIONS

Office Action dated Dec. 21, 2010, issued in co-pending U.S. Appl. No. 11/646,192, filed on Dec. 27. 2006 of Thu-Van Luu.

(Continued)

*Primary Examiner* — Bernarr E Gregory
(74) *Attorney, Agent, or Firm* — Howard IP Law Group (57) ABSTRACT

A method and a system for sensing a boosting target missile, estimate position and velocity and boost acceleration parameters of the target missile, and control an interceptor missile to the target missile. A boost-phase missile target state estimator estimates at least acceleration, velocity, and position using an acceleration template for the target vehicle. The nominal template is incorporated into an extended Kalman filter which corrects the nominal template acceleration with the filter states to predict future thrust acceleration, velocity and position. The correction can compensate for motor burn variations and missile energy management (lofted/depressed trajectory).

20 Claims, 8 Drawing Sheets

U.S. PATENT DOCUMENTS

| | | | |
|---|---|---|---|
| 3,964,695 A | 6/1976 | Harris | |
| 3,982,713 A | 9/1976 | Martin | |
| 3,996,590 A * | 12/1976 | Hammack | 342/107 |
| 4,093,153 A | 6/1978 | Bardash et al. | |
| 4,470,562 A | 9/1984 | Hall et al. | |
| 4,502,650 A | 3/1985 | Yueh | |
| 4,568,823 A | 2/1986 | Diehl et al. | |
| 4,589,610 A | 5/1986 | Schmidt | |
| 4,791,573 A | 12/1988 | Zemany et al. | |
| 4,856,733 A | 8/1989 | Lachmann | |
| 4,925,129 A | 5/1990 | Salkeld et al. | |
| 5,050,818 A | 9/1991 | Sundermeyer | |
| 5,170,440 A | 12/1992 | Cox | |
| 5,198,607 A | 3/1993 | Livingston et al. | |
| 5,296,861 A | 3/1994 | Knight | |
| 5,319,556 A | 6/1994 | Bessacini | |
| 5,340,056 A | 8/1994 | Guelman et al. | |
| 5,341,142 A * | 8/1994 | Reis et al. | 342/64 |
| 5,379,044 A | 1/1995 | Carlson et al. | |
| 5,379,966 A | 1/1995 | Simeone et al. | |
| 5,414,643 A | 5/1995 | Blackman et al. | |
| 5,429,322 A | 7/1995 | Waymeyer | |
| 5,458,041 A | 10/1995 | Sun et al. | |
| 5,464,174 A | 11/1995 | Laures | |
| 5,471,433 A | 11/1995 | Hammell et al. | |
| 5,474,255 A | 12/1995 | Levita | |
| 5,506,586 A | 4/1996 | Bull | |
| 5,537,118 A | 7/1996 | Appriou | |
| 5,557,347 A | 9/1996 | Johnson | |
| 5,660,355 A | 8/1997 | Waymeyer | |
| 5,710,423 A | 1/1998 | Biven et al. | |
| 5,757,310 A | 5/1998 | Millward | |
| 5,765,166 A | 6/1998 | Gotfried et al. | |
| 5,788,179 A | 8/1998 | Wicke | |
| 5,793,931 A | 8/1998 | Hillis | |
| 5,811,788 A | 9/1998 | Wicke | |
| 5,862,496 A | 1/1999 | Biven | |
| 5,912,640 A * | 6/1999 | Bradford et al. | 342/99 |
| 5,959,574 A | 9/1999 | Poore, Jr. | |
| 5,960,097 A | 9/1999 | Pfeiffer et al. | |
| 6,011,507 A | 1/2000 | Curran et al. | |
| 6,043,867 A | 3/2000 | Saban | |
| 6,064,332 A | 5/2000 | Cloutier | |
| 6,082,666 A | 7/2000 | Windhorst et al. | |
| 6,091,361 A | 7/2000 | Davis et al. | |
| 6,104,336 A | 8/2000 | Curran et al. | |
| 6,209,820 B1 * | 4/2001 | Golan et al. | 244/3.15 |
| 6,259,974 B1 | 7/2001 | Bessacini et al. | |
| 6,262,680 B1 | 7/2001 | Muto | |
| 6,278,401 B1 | 8/2001 | Wigren | |
| 6,314,204 B1 | 11/2001 | Cham et al. | |
| 6,404,380 B2 | 6/2002 | Poore, Jr. | |
| 6,498,580 B1 | 12/2002 | Bradford | |
| 6,527,222 B1 | 3/2003 | Redano | |
| 6,543,716 B1 | 4/2003 | Miller et al. | |
| 6,549,158 B1 | 4/2003 | Hanson | |
| 6,561,074 B1 | 5/2003 | Engel et al. | |
| 6,563,450 B1 | 5/2003 | Wallace | |
| 6,568,628 B1 | 5/2003 | Curtin et al. | |
| 6,575,400 B1 | 6/2003 | Hopkins et al. | |
| 6,603,421 B1 | 8/2003 | Schiff et al. | |
| 6,666,401 B1 | 12/2003 | Mardirossian | |
| 6,674,390 B1 | 1/2004 | Murphy, Jr. | |
| 6,720,907 B1 | 4/2004 | Miron | |
| 6,739,547 B2 | 5/2004 | Redano | |
| 6,750,806 B2 | 6/2004 | Fischer | |
| 6,771,205 B1 | 8/2004 | Barton et al. | |
| 6,799,138 B2 | 9/2004 | Lawrence et al. | |
| 6,877,691 B2 | 4/2005 | DeFlumere et al. | |
| 6,990,885 B2 | 1/2006 | Boyd | |
| 7,026,980 B1 * | 4/2006 | Mavroudakis et al. | 342/90 |
| 7,137,588 B2 | 11/2006 | Humphrey | |
| 7,181,323 B1 | 2/2007 | Boka et al. | |
| 7,190,304 B1 * | 3/2007 | Carlson | 342/62 |
| 7,348,918 B2 * | 3/2008 | Redano | 342/62 |
| 7,394,047 B1 * | 7/2008 | Pedersen | 244/3.1 |
| 7,400,289 B1 * | 7/2008 | Wolf | 342/62 |
| 7,411,543 B1 * | 8/2008 | Boka | 342/90 |
| 7,473,876 B1 * | 1/2009 | Pedersen et al. | 244/3.1 |
| 7,511,252 B1 * | 3/2009 | Pedersen et al. | 244/3.1 |
| 7,552,669 B1 | 6/2009 | Denis et al. | |
| 7,791,006 B2 | 9/2010 | Hasson et al. | |
| 7,886,646 B2 | 2/2011 | Bannasch et al. | |
| 2002/0008657 A1 | 1/2002 | Poore, Jr. | |
| 2003/0172832 A1 | 9/2003 | O'Dwyer | |
| 2004/0004155 A1 | 1/2004 | DeFlumere et al. | |
| 2005/0114023 A1 | 5/2005 | Williamson et al. | |
| 2005/0128138 A1 | 6/2005 | McCabe et al. | |
| 2006/0065150 A1 | 3/2006 | O'Dwyer | |
| 2006/0074558 A1 | 4/2006 | Williamson et al. | |

OTHER PUBLICATIONS

U.S. Appl. No. 12/967,149 filed Dec. 14, 2010, entitled "System and Method for Detecting use of Booster Rockets by Ballistic Missiles", in the name of Richard N. Pedersen.

T. Wigren et al., "Operational Multi-Sensor Tracking for Air Defense"; IEEE Publication 0-7803-3601-1196/$5.00; copyright in the year 1996.

S.S. Blackman, "Multiple Hypothesis Tracking for Multiple Target Tracking"; IEEE A&E Systems Magazine; vol. 19, No. 1; Jan. 2004; pp. 5-18.

K.C. Chang et al., "Evaluating a Multiple-Hypothesis Multitarget Tracking Algorithm"; IEEE Trans. on Aerospace and Electronic Systems; vol. 30, No. 2; Apr. 1994; pp. 578-590.

Zarchan, Paul, "Tactical and Strategic Missile Guidance," American Institute of Aeronautics and Astronautics; Washington DC, 1990; pp. 308-319.

Papalambros, Panos and Wilde, Douglas, "Principles of Optimal Design, Modeling and Computation", Second Edition, Cambridge University Press, Cambridge UK, 2000; pp. 279-295.

"Numerical Recipes in C, the Art of Scientific Computing," Second Edition, Cambridge University Press, Cambridge UK, 1993; pp. 397-425.

"Adaptive interacting multiple model tracking of manuevering targets", Layne, J.R.; Piyasena, U.C. Digital Avionics Systems Conference, 1997; 16th DASC., AIAA/IEEE vol. 1, Oct. 26-30, 1997, Ps:5. 3-16-23.

"Fuzzy multiple model tracking algorithm for manoeuvring target", Dongguang Zuo; Chongzhao Han; Zheng Lin; Hongyan Zhu; Han Hong Information Fusion, 2002, Proceedings of the Fifth International Conference on vol. 2; 2002 Ps: 818-823.

"Efficient robust AMF using the FRACTA algorithm", Blunt, S.D.; Gerlach K. Aerospace and Electronic Systems; IEEE Transactions on vol. 41, Issue 2, Apr. 2005 Page(s): 537-548.

Kreyszig, E., "Advanced Engineering Mathematics," Eight Edition, John Wiley & Sons, Inc. 1999, pp. 942-952.

R.L. Garwin, "Boost-Phase Intercept-Not If, But When", Jul. 12, 2000; "Inside Missile Defense".

D.E. Mosher, "The Grand Plans"; IEEE Spectrum, Sep. 1997, pp. 28-39.

E.L. Crosson et al., "Boost-Phase Acceleration Estimation", Proceedings of the IEEE International Radar Conference of the Year 2000, pp. 210-214.

U.S. Appl. No. 12/612,056 filed Nov. 4, 2009, entitled "Maneuvering Missile Engagement" in the name of Friedman, Daniel L.

U.S. Appl. No. 12/473,032 filed May 27, 2009, entitled "Method for Targeting a Preferred Object Within a Group of Decoys", in the name of Boardman et al.

U.S. Appl. No. 12/395,830 filed Mar. 2, 2009, entitled "Generalized Midcourse Missile Guidance", in the name of Diaz, Frederick U.

* cited by examiner

| NOMINAL TARGET TEMPLATE | | | | |
|---|---|---|---|---|
| TAL | BOOST ACCELERATION | SPEED | ALTITUDE | ANGLE OF ATTACK |
| $T_1$ | $AB_1$ | $V_1$ | $ALT_1$ | $AOA_1$ |
| $T_2$ | $AB_2$ | $V_2$ | $ALT_2$ | $AOA_2$ |
| $T_3$ | $AB_3$ | $V_3$ | $ALT_3$ | $AOA_3$ |
| $T_4$ | $AB_4$ | $V_4$ | $ALT_4$ | $AOA_4$ |
| $T_5$ | $AB_5$ | $V_5$ | $ALT_5$ | $AOA_5$ |
| $T_6$ | $AB_6$ | $V_6$ | $ALT_6$ | $AOA_6$ |
| $T_7$ | $AB_7$ | $V_7$ | $ALT_7$ | $AOA_7$ |
| $T_8$ | $AB_8$ | $V_8$ | $ALT_8$ | $AOA_8$ |
| $T_9$ | $AB_9$ | $V_9$ | $ALT_9$ | $AOA_9$ |
| $T_{10}$ | $AB_{10}$ | $V_{10}$ | $ALT_{10}$ | $AOA_{10}$ |
| $T_{11}$ | $AB_{11}$ | $V_{11}$ | $ALT_{11}$ | $AOA_{11}$ |

TEMPLATE UPDATED BOOST ALGORITHM

This application is a continuation-in-part of application Ser. No. 11/189,234, filed Jul. 26, 2005, now abandoned.

FIELD OF THE INVENTION

This invention relates to methods for sensing a boosting target missile, estimating its position and velocity and boost acceleration parameters, and controlling an interceptor missile to the target.

BACKGROUND OF THE INVENTION

Ballistic missile defense has become a significant priority as national intelligence indicates a growing missile threat from rogue nations that might obtain weapons of mass destruction and use ballistic missiles to fire them at U.S. forces abroad, U.S. allies or the continental United States. A desirable engagement strategy against ballistic missiles is to intercept the target as early as possible during the boost phase or early ascent phase when the target is a large object and has not dispersed counter measures or multiple warheads. Such a strategy minimizes the requirements for warhead and decoy discrimination, and allows for multi-layered defense opportunities. A missile defense system supporting this strategy must include an accurate boost phase target state estimator. Without accurate target state estimates, a fire control system (also known throughout this document as weapons control system) cannot obtain valid intercept solutions for launching the interceptor during boost, and intercepting during the early ascent phase.

Figure 1:
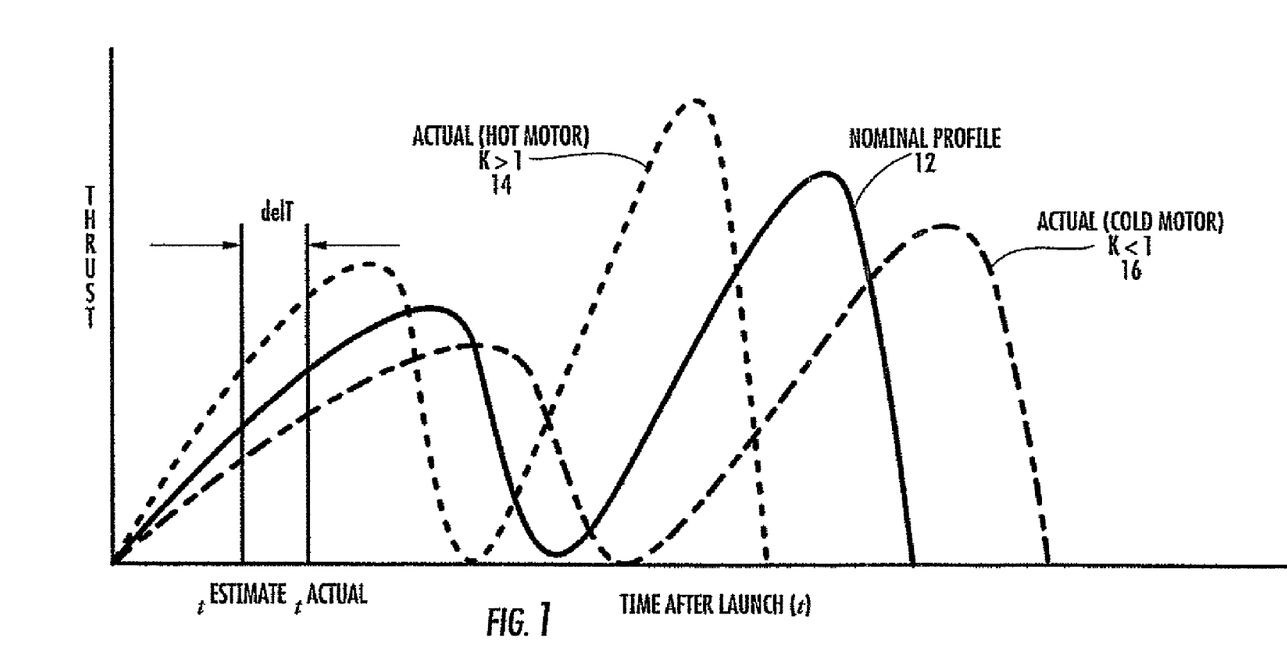
FIG. 1 illustrates variations in target thrust acceleration profiles due to motor variations.

Challenges in developing boost phase tracking include unpredictable target accelerations while the target is in powered flight, and uncertainty of its burn time. Targets powered by solid rocket motor targets present the additional challenge of irregular thrust acceleration profiles. Due to the significant changes in acceleration during the target's boost phase, filters that assume constant acceleration cannot meet the stringent accuracies required of most fire control systems. Current state-of-the-art template-based filters use position and velocity templates assuming constant accelerations or rocket equation acceleration modeling. Such templates are subject to error attributable to motor burn variations, energy management (lofted/depressed trajectories), ISP variations, and early thrust terminations. FIG. 1 is a plot of target thrust versus time for "hot," nominal and "cold" rocket motors or engines. The nominal thrust profile as a function of time after launch (TAL) is shown by plot 12. The actual motor may be a variation about this nominal profile. For a hot motor, the motor gain is greater than 1, K>1, with the thrust profile shown by plot 14. For a cold motor, the motor gain is less than 1, K<1, with the thrust profile shown by plot 16. It will be clear that the accelerations represented by the thrust profiles of FIG. 1 are significantly different.

In addition, uncertain knowledge of the time of launch of the target results in error in estimating the time after launch. The uncertainty in knowledge of the time after launch leads to error in indexing into the template, which in turn tends to introduce more error in the acceleration estimate. For example, if the estimate of time after launch in FIG. 1 is indicated by $t_{estimate}$ and the actual time is indicated by $t_{actual}$, there will be a substantial error in estimating the acceleration even if the proper plot were known. The indexing error and acceleration variations from the nominal template all contribute to erroneous acceleration estimates and ultimately poor estimates of the target velocity and position. The indexing error, delT, is the uncertainty in the target's time after launch (TAL), i.e., the time difference between the initial index into the nominal template and the target's true TAL.

Improved or alternative target tracking and intercept control are desired.

SUMMARY OF THE INVENTION

A method according to an aspect of the invention is for attacking a target missile in its boost state. The method comprises the steps of sensing the target and generating signals representative of the target position. From the signals representative of the target position, estimating the states of a boosting target using nominal templates. The templates comprise profiles of the target (a) thrust acceleration, (b) altitude, (c) speed, and (d) angle-of-attack as a function of time after launch, all updated using the states of a filter to correct for template indexing error, template boost acceleration variations, and template angle-of-attack variations, thereby producing estimated target states unencumbered by motor burn boost variations and providing for accurate determination of end-of-boost. The target states are applied to determine target acceleration, and the firing and guidance of an interceptor missile are controlled in response to the estimated target states and the target acceleration.

A method according to an aspect of the invention is for attacking a target missile in its boost state. The method comprises the steps of sensing the target and generating signals representative of the target position. From the signals representative of the target position, the state of a boost vehicle or target is estimated. The estimated state includes position and velocity, and at least one of (a) variation in engine burn rate, (b) error in time after launch and (c) error in angle of attack. The method comprises the steps of (A) providing a template characterizing nominal values of acceleration of the target due to engine thrust, speed, altitude, and angle-of-attack, all as a function of time after target launch, (B) calculating target altitude from the target-position information to generate calculated target altitude, (C) establishing a time index by entering the template at the calculated target altitude, (D) reading from the template at least that nominal value of time after launch, acceleration, speed, and angle of attack corresponding to the calculated target altitude, (E) initializing both the state estimate and the associated covariances of an extended Kalman filter with the nominal value of time after launch, acceleration, speed, and angle of attack corresponding to the calculated target altitude, (F) propagating in time the state estimates and covariances of the Kalman filter to generate a time-updated vector of state estimates representing the predicted state of the target, using at least one of the template profile information updated by (a) variation in engine burn rate, (b) error in time after launch and (c) error in angle of attack, (G) updating the states using the measurements to produce a vector of measurement updated state estimates and covariances of the target, including position and velocity, and at least one of (a) variation in engine burn rate, (b) error in time after launch and (c) error in angle of attack, (H) applying the states to determine target acceleration, and controlling the firing and guidance of an interceptor missile in response to the estimated states and the target acceleration. In an advantageous mode of this method, the step of providing a template characterizing nominal values of acceleration of the target comprises the step of providing a template characterizing nominal values of boost acceleration.

A method for attacking a target missile in its boost state comprises the steps of sensing the target and generating target-position information representative of the target position.

From the target-position information representative of the target position, the state of the boosting target is estimated by the steps of:
   providing a template characterizing nominal values of acceleration of the target as a function of time after target launch;
   calculating target altitude from the target-position information to generate calculated target altitude;
   establishing a time index by entering the template at the calculated target altitude;
   reading from the template nominal value of at least one of (a) time after launch, (b) acceleration, (c) speed, and (d) angle of attack corresponding to the calculated target altitude;
   initializing both the state estimate and the associated covariances of an extended Kalman filter with the nominal value corresponding to the calculated target altitude, to thereby generate state estimates and covariances of the Kalman filter;
   propagating in time the state estimates and covariances of the Kalman filter to generate a time-updated vector of state estimates representing the predicted state of the target, to thereby generate propagated target states; and
   updating the propagated target states using measurements, to produce a vector of measurement updated state estimates and covariances of the target.
The method for attacking a target missile further comprises the steps of applying the updated state estimates and covariances to determine target acceleration, and controlling the firing and guidance of an interceptor missile in response to the updated state estimates and the target acceleration. In a particular mode of this method, the step of providing a template characterizing nominal values of acceleration of the target includes the step of providing a template characterizing nominal values of acceleration of the target due to engine thrust, speed, altitude, and angle-of-attack, all as a function of time after target launch. In another mode of this method, the step of reading from the template nominal value includes the step of reading from the template at least that nominal value of time after launch, acceleration, speed, and angle of attack corresponding to the calculated target altitude, to thereby produce read nominal values. In this mode, the step of initializing both the state estimate and the associated covariances of an extended Kalman filter with the read nominal values includes the step of initializing both the state estimate and the associated covariances of an extended Kalman filter with the nominal value of time after launch, acceleration, speed, and angle of attack corresponding to the calculated target altitude. In yet another mode of this method, the step of propagating in time the state estimates and covariances of the Kalman filter to generate a time-updated vector of state estimates representing the predicted state of the target includes the step of propagating in time the state estimates and covariances of the Kalman filter to generate a time-updated vector of state estimates representing the predicted state of the target, using at least one of the template profile information updated by (a) variation in engine burn rate, (b) error in time after launch and (c) error in angle of attack. In a further mode of this method, the step of sensing at least the position of the target further comprises the steps of (A) making measurements of the position of the target, and (B) the step of updating the propagated target states includes the step of updating the target states using the measurements to produce a vector of measurement updated state estimates and covariances of the target, including position and velocity, and at least one of (a) variation in engine burn rate, (b) error in time after launch and (c) error in angle of attack.

A ballistic missile detection and defense system according to an aspect of the invention comprises a missile detection arrangement for estimating at least the time after launch of a ballistic missile. The system also includes a missile tracking arrangement for receiving the time after launch from the missile detection arrangement, and for estimating the state of the missile in flight, the missile tracking arrangement comprises at least one nominal profile template of missile (a) altitude, (b) speed, and (c) angle-of-attack as a function of the time after launch. A comparator compares missile estimated state with the at least one nominal profile template, and, if a match is found, identifying that missile on which the matching nominal profile is based.

DESCRIPTION OF THE INVENTION

Figure 2:
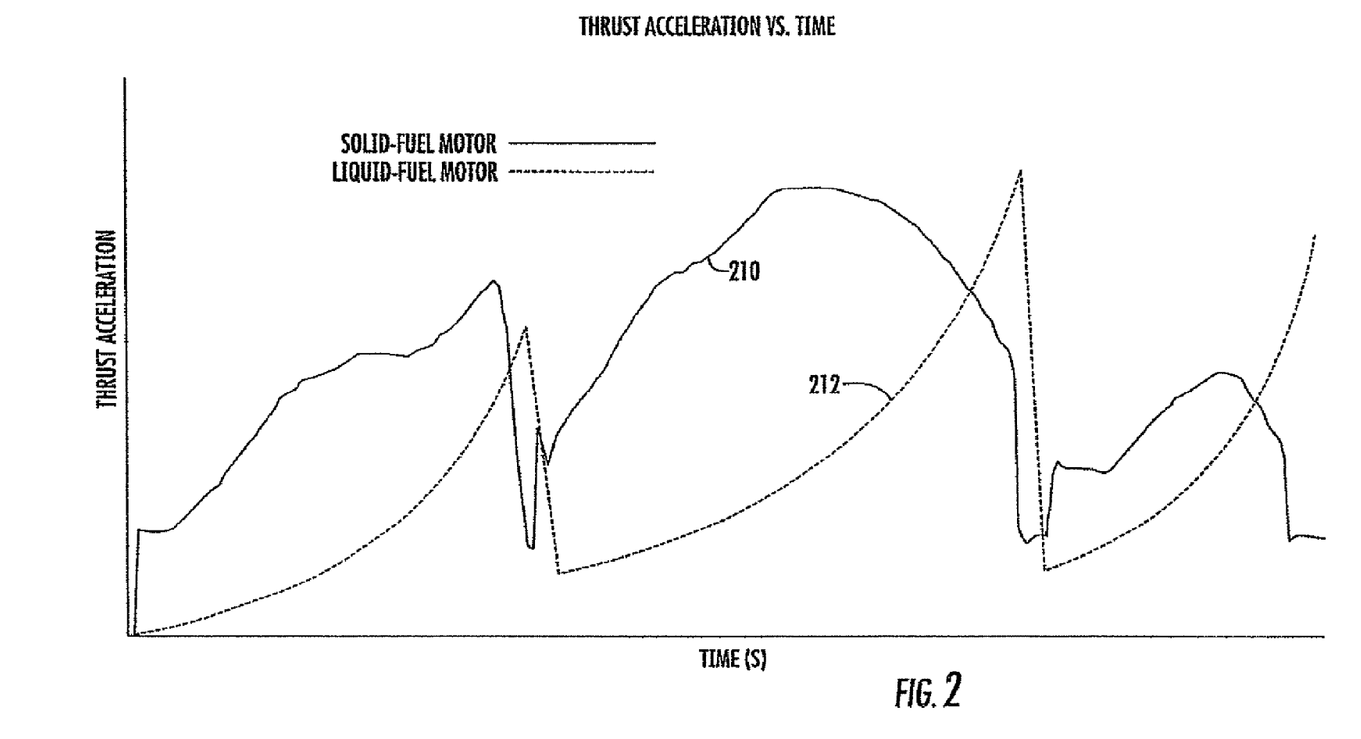
FIG. 2 illustrates typical thrust acceleration profiles for solid- and liquid-fuel motors.

The Template Updated Boost Algorithm (TUBA) is a novel boost phase filter or processing used in an aspect of the invention. TUBA estimates variations with respect to nominal templates representing the target's kinematic motion. FIG. 2 is an example of a typical nominal template file of thrust acceleration versus time in seconds (s). In FIG. 2, the thrust acceleration profile of a solid-fuel motor is illustrated by a solid line designated 210, and the profile for a liquid-fuel motor is illustrated by a dash line designated 212. TUBA is capable of estimating rocket motor burn variations, template indexing error (the time difference between the actual and the estimated Time After Launch), and target's angle of attack. Using nominal templates corrected by these unique filter states, TUBA predicts future thrust acceleration, position, and velocity vectors with improved reliability. This can be crucial for fire control systems, where knowing the target's future position and velocity is needed to accurately predict an intercept point.

Another boost phase filter is described in U.S. Pat. No. 7,181,323, issued Feb. 20, 2007 in the name of Boka et al. and entitled Computerized Method for Generating Low-Bias Estimates of Position of a Vehicle From Sensor Data. This boost filter is the Unified Unbiased Rocket Equation Extended Kalman Algorithm (UUREEKA). It differs from TUBA used in the current invention in that UUREEKA models target dynamics using the fundamental rocket equation and is ideal for tracking liquid-fueled targets whose acceleration profiles can be modeled using the rocket equation. UUREEKA is less advantageous for solid fuel rocket motor that exhibit irregular thrust profiles. TUBA is well adapted for tracking solid-fuel targets that have irregular thrust acceleration profiles, which cannot be modeled by the rocket equation. As mentioned, FIG. 2 shows a representative thrust acceleration profile 210 for a solid rocket motor, and a liquid rocket motor profile 212. Since TUBA is template based, it can also be used to track liquid-fuel targets governed by the rocket equation. TUBA complements UUREEKA by providing capability against solid rocket fuel based target threats. Thus, the combination of UUREEKA and TUBA filtering may provide more complete capability against all ballistic missile threats.

Figure 3:
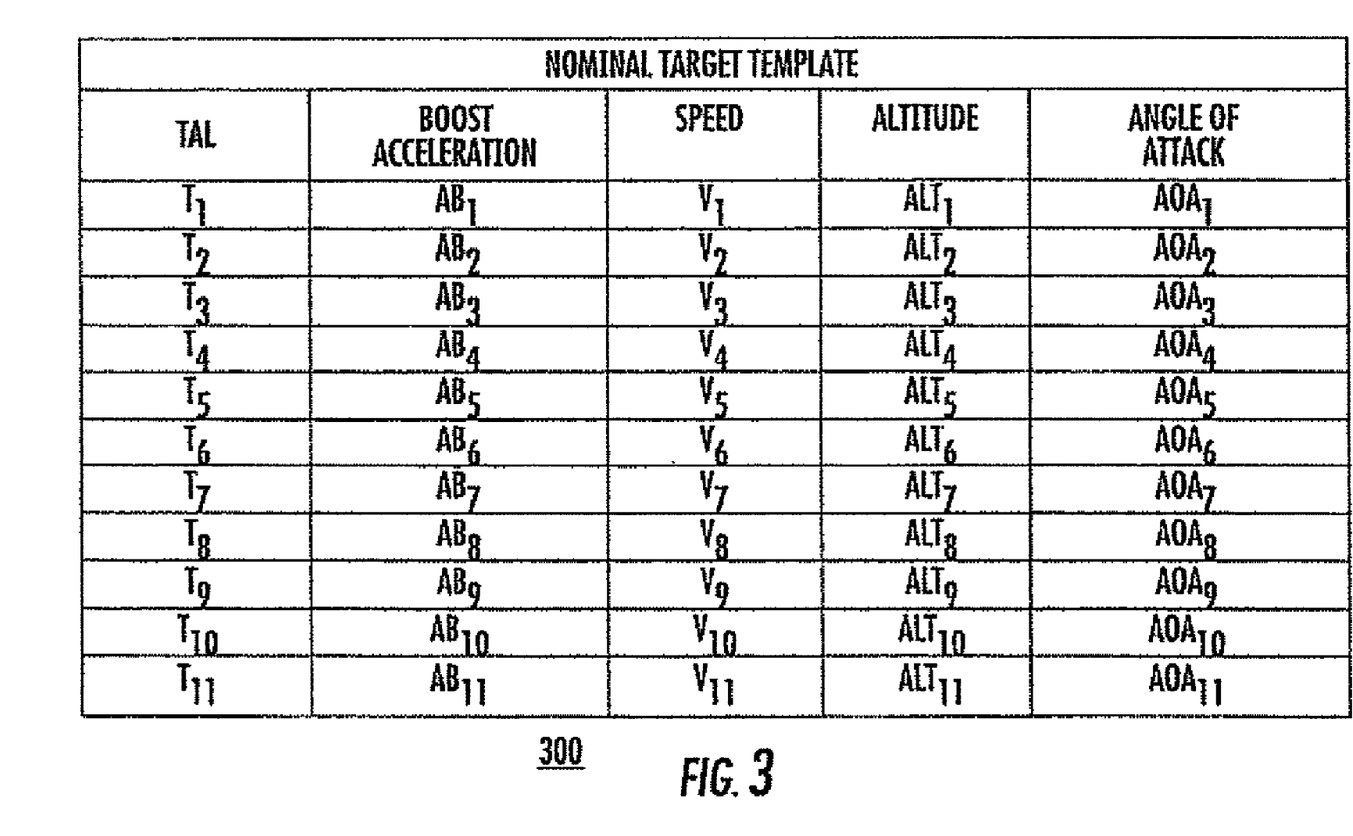
FIG. 3 is a tabular representation of nominal target templates listing nominal values of boost acceleration, speed, altitude, and angle of attack as a function of time after launch, for a particular known type of target.

The processing according to TUBA includes a template filter which utilizes a table of nominal target data relating target time after launch (TAL) to boost acceleration, speed, altitude, and angle of attack. An example of a nominal target template data table 300 appears as FIG. 3. In FIG. 3, various Time After Launch (TAL) values designated $T_1$, $T_2$, $T_3$, $T_4$, $T_5$, $T_6$, $T_7$, $T_8$, $T_9$, $T_{10}$, and $T_{11}$ correlate to Boost Acceleration values $AB_1$, $AB_2$, $AB_3$, $AB_4$, $AB_5$, $AB_6$, $AB_7$, $AB_8$, $AB_9$, $AB_{10}$, and $AB_{11}$, respectively, to Speed values $V_1$, $V_2$, $V_3$, $V_4$, $V_5$, $V_6$, $V_7$, $V_8$, $V_9$, $V_{10}$, and $V_{11}$, respectively, to Altitude values $Alt_1$, $Alt_2$, $Alt_3$, $Alt_4$, $Alt_5$, $Alt_6$, $Alt_7$, $Alt_8$, $Alt_9$, $Alt_{10}$, and $Alt_{11}$, respectively, and to Angle of Attack values $AOA_1$, $AOA_2$, $AOA_3$, $AOA_4$, $AOA_5$, $AOA_6$, $AOA_7$, $AOA_8$, $AOA_9$, $AOA_{10}$, and $AOA_{11}$, respectively. Of course, a template may include many more values than the illustrated 11 values, or possibly fewer.

Figure 4:
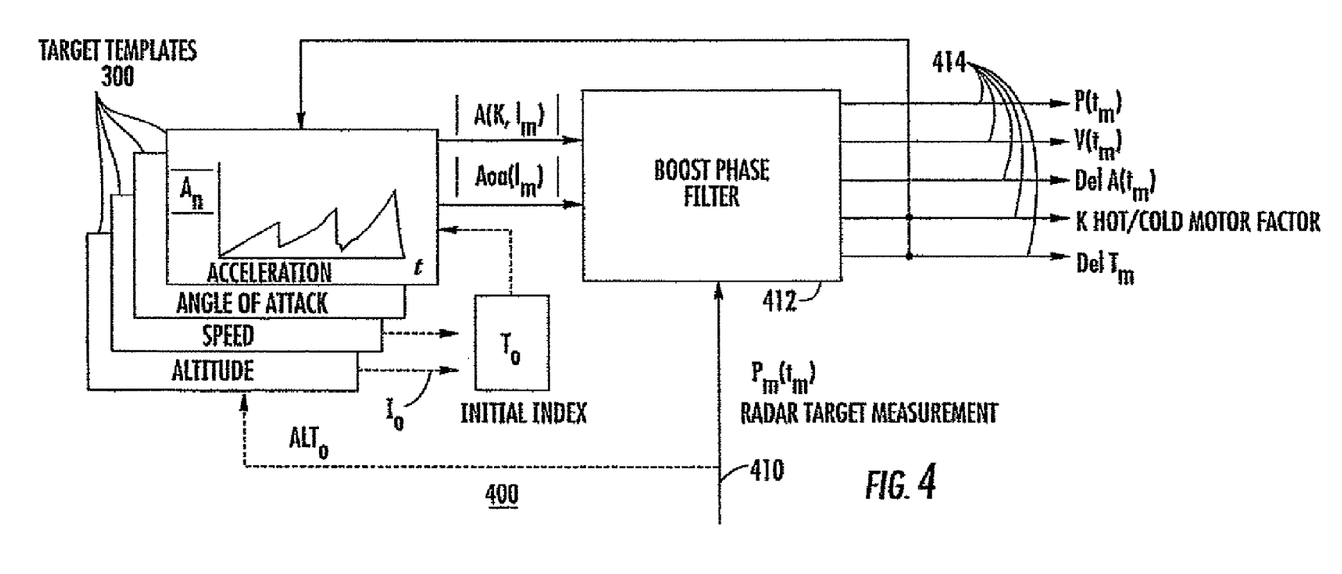
FIG. 4 is a simplified functional block diagram of a template updated boost state estimating arrangement according to an aspect of the invention.

Diagram 400 of FIG. 4 shows how the nominal target template is used in the TUBA process. In FIG. 4, the current radar target measurement, in digital form, is applied by way of a path 410. Ordinarily, the template initialization is performed using the altitude template. Systems such as Spaced Based Infrared Sensor (SBIRS) also provide velocity information which could be used for template initialization using the speed template.

The entry point into the target template 300 of FIG. 4 is found using the current measurement altitude, $Alt_o$, calculated from current target measurement data. A lookup algorithm is used to select the time index, $I_o$, in the table corresponding to $Alt_o$. $I_o$ refers to the template time index $T_I$ indicated by a subscript in the TAL column of FIG. 3. Thus, if the calculated (or otherwise determined) altitude is, say, one thousand feet, the corresponding altitude in the table might be $T_4$, and the corresponding index is $I_4$. $I_o$ is then used as the initial time entry into the acceleration and angle of attack templates to obtain the target's nominal boost acceleration, and angle of attack. In the example, the index $I_4$ would point to acceleration $AB_4$ and angle of attack $AOA_4$. TUBA processing as represented by block 412 in FIG. 4 uses the Boost acceleration $AB(K, I_m)$ and Angle of Attack $AOA(I_m)$ from the template 300 to produce accurate estimates of the target's position $P(t_m)$ and velocity states $V(t_m)$. In addition, block 412 estimates the error $delA(t_m)$ in angle of attack, error delI in the time index into the template, and a scalar (hot/cold) motor variation factor, K. In conjunction with the typical position and velocity states, additional states delT and K, are used to adjust the initial time index $I_o$ to account for initial time index error (possibly attributable to incorrect initial estimate of altitude) and template difference due to motor variations.

Figure 5:
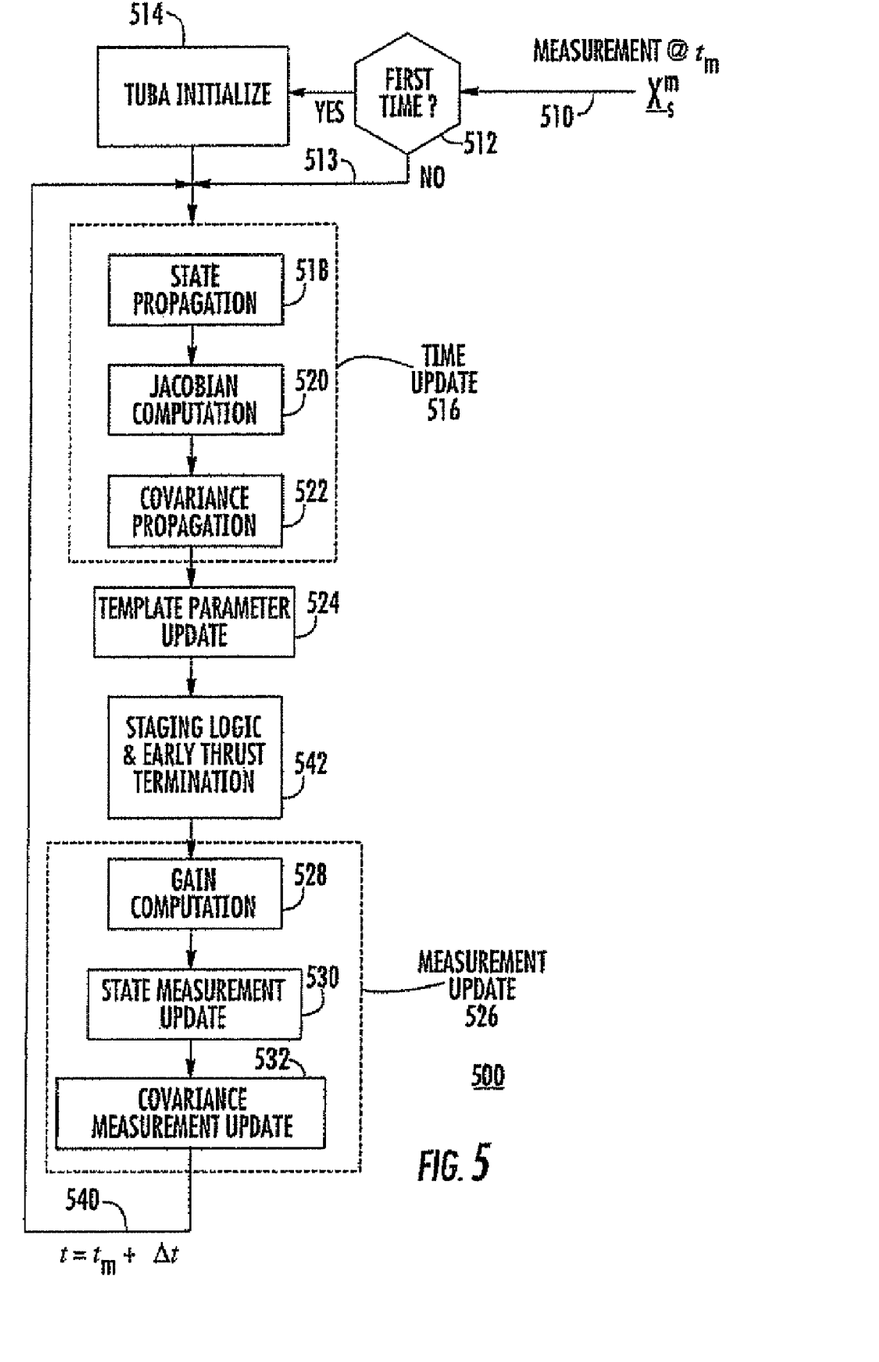
FIG. 5 is a simplified logic flow chart or diagram illustrating computer processing which implements the template updated boost algorithm according to an aspect of the invention.

The TUBA algorithm associated with block 412 of FIG. 4 is represented by a logic flow chart or diagram 500 of FIG. 5.

In the logic flow of FIG. 5, a target missile measurement is received at time $t_m$ as suggested by logic path 510. The algorithm 500 begins with initialization of filter and timing parameters in blocks 512 and 514. Initial estimates of the filter states and state covariances are then propagated forward in time corresponding to the Kalman "time update" step 516. Staging timing parameters are updated in block 524, after the state propagation, and staging events and early thrust termination are determined in block 542. Finally, the Kalman Gains are computed, and the measurement updated state covariances are updated corresponding to the Kalman filter "measurement update" step 526. The process repeats with the measurement updated state estimates and error covariance feeding back to the time update equations.

Figure 6:
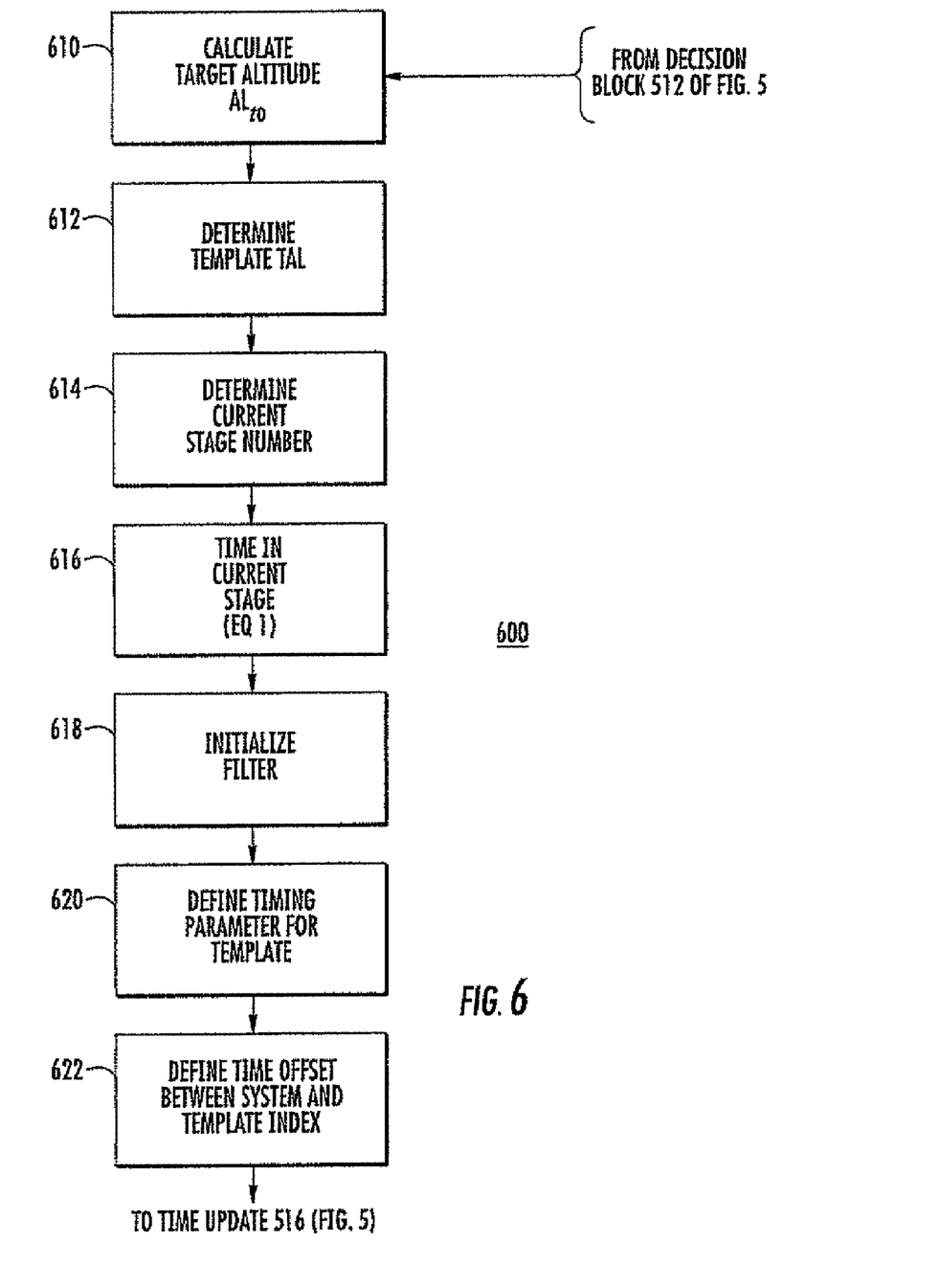
FIG. 6 is a simplified logic flow chart or diagram illustrating an initialization portion of the logic of FIG. 5.
Figure 7:
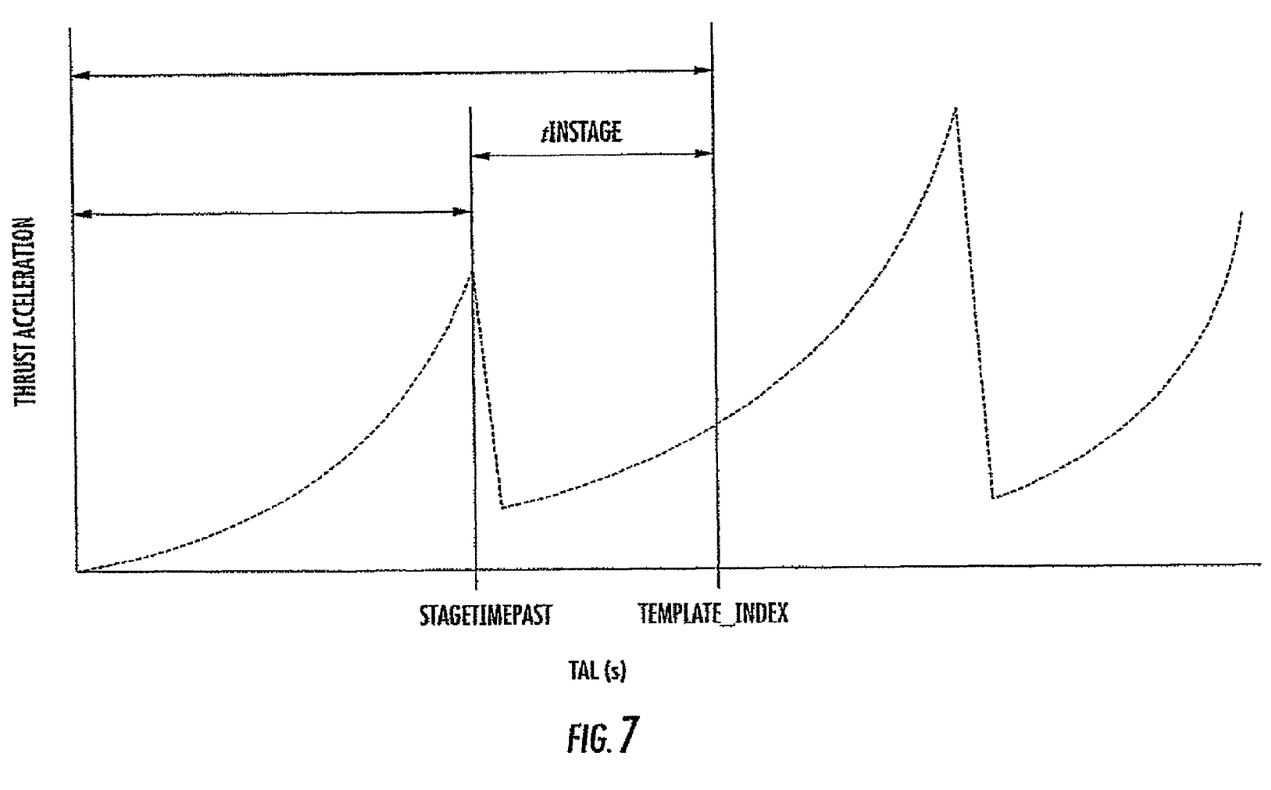
FIG. 7 illustrates a nominal thrust acceleration template versus time after launch, to aid in defining certain parameters.

More specifically, the TUBA process of FIG. 5 begins with arrival over a path 510 of an initial position measurement from a sensor tracking a boosting target. Decision block 512 initially routes the measurement to the TUBA Initialization function or block 514. The TUBA Initialization function 514 initializes the filter and template parameters. FIG. 6 represents the logic 600 of the TUBA Initialization step 514 of FIG. 5. In FIG. 6, the first step in initialization of the filter and template parameters is to calculate target altitude $Alt_o$ from the current measured position input, as suggested by block 610 of FIG. 6. From block 610, the logic of the initialization 600 flows to a block 612, which represents use of the table lookup to determine target Time After Launch (TAL) template_index, for the given $Alt_o$. Block 614 represents use of the template_index produced by block 612 together with nominal staging times. Nominal staging times are not derived from part of the templates which are a function of time; rather they are a few data points corresponding to nominal times when the target begins the next stage. For example, if the target has three stages, there will be three corresponding nominal staging times. Nominal staging times are used to determine the target's current stage number thisStage. The amount of elapsed time in the current stage tInstage is determined in a block 616 by $$tInstage = template\_index - stageTimePast \quad (1)$$

where stageTimePast is the nominal stage time of the previous stage, as illustrated in FIG. 7. In FIG. 7, the current time into the template is template_index. Block 618 of FIG. 6 represents the initialization of Kalman filter states and error covariances to produce equations (2), (3), (4), (5), and (6)

$$\underline{X} = \underline{X}_M \quad (2)$$

is the initial position vector (set to measured value);

$$\underline{\dot{X}} = \underline{\dot{X}}_M \quad (3)$$

is the initial velocity vector (set to an initial estimate);

$$K = 1 \quad (4)$$

is the motor parameter (set to nominal value);

$$delT = 0 \quad (5)$$

is the initial estimate of error in template_index; and $$delA = 0 \quad (6)$$

is the initial estimate of error in angle of attack.

The TUBA Initialization function 514, represented as 600 of FIG. 6, includes a block 620 which represents the definition of the timing parameter template_index used to look up values from the nominal template $$Template\_index = (tInstage - delT) * K + stageTimePast \quad (7)$$

From block 620, the logic of FIG. 6 flows to a block 622, which represents the definition of the time offset between the system time and template_index $$\text{offsetError} = \text{template\_index} - \text{tgtMeasTime} \tag{8}$$

where variable "tgtMeasTime" is the current system time, variously designated t or tm in FIG. 5.

TUBA uses a nine-state Kalman filter which estimates the position and velocity vectors and three additional states. The three additional states are used to resolve the deficiencies associated with the use of a nominal acceleration profile. The TUBA filter equations are developed under the assumption that the target is either ballistic (falling under the force of gravity) or the specific force (such as thrust acceleration) is exactly known and can therefore be compensated for. It is also assumed that the target is not subject to significant atmospheric drag, which is reasonable in view of the high altitudes at which target tracking occurs. Alternatively, it is assumed that atmospheric drag can be properly compensated for. Equations (9), (10), and (11) model the target kinematics under these assumptions $$\underline{\ddot{X}} = Acc\text{Gravity} + Acc\text{Centripetal} + Acc\text{Thrust} + Acc\text{Coriolis} \tag{9}$$

$$\underline{\ddot{X}} = \frac{-\mu \underline{Z}}{|\underline{Z}|^3} - \underline{\omega} \times (\underline{\omega} \times \underline{Z}) + |Tacc| * \hat{\underline{T}} - 2\underline{\omega} \times \underline{\dot{X}} \tag{10}$$

$$\underline{Z} = \underline{X} + \underline{Re} \tag{11}$$

where:
  $\mu$ is the Earth gravitational constant,
  w is the magnitude of Earth's angular velocity,
  |Tacc| is the boost acceleration magnitude; and
  $\hat{T}$ is the unit thrust vector.
The TUBA state vector is $$s = \begin{Bmatrix} \underline{X} \\ \underline{\dot{X}} \\ K \\ delT \\ delA \end{Bmatrix} \tag{12}$$

where:
  $\underline{X}$ and $\underline{\dot{X}}$ are three-dimensional position and velocity vectors, respectively;
  K is a scalar factor reflecting the target rocket motor, hot (K>1.0), cold (K<1.0), or nominal (K=1.0);
  delT is the error in the initial time used to look up target parameters from the nominal templates; and
  delA is the error in the estimate of the target's angle of attack.
The TUBA dynamics equations (i.e. the nonlinear TUBA state derivative equations) are $$\dot{s} = \frac{d}{dt} s = \begin{Bmatrix} \underline{\dot{X}} \\ \frac{-\mu \underline{Z}}{|\underline{Z}|^3} - \underline{\omega} \times (\underline{\omega} \times \underline{Z}) + |Tacc| * \hat{\underline{T}} - 2\underline{\omega} \times \underline{\dot{X}} \\ 0 \\ 0 \\ 0 \end{Bmatrix} \tag{13}$$

and are based on the assumed target kinematics set forth above. Additionally, it is assumed that K, delT, and delA are constants.

The thrust acceleration |Tacc|, is obtained from the nominal acceleration template using template_index and K estimate as $$|Tacc| = K * \text{BoostAccLookup}(\text{template\_index}) \tag{14}$$

The unit thrust vector $\hat{T}$ is calculated using the nominal angle of attack lookup, estimated position, velocity, and delA as $$AoaEst = AOA\text{Lookup}(\text{template\_index}) + delA \tag{15}$$

$$\underline{yL2} = \hat{\underline{\dot{X}}} \tag{16}$$

$$\underline{zL2} = (\hat{\underline{\dot{X}}} = \hat{\underline{X}}) = \underline{yL2} \tag{17}$$

$$\hat{\underline{T}} = \underline{yL2} * \cos(AoaEst) - \underline{zL2} * \sin(AoaEst) \tag{18}$$

where the template_index is defined by equation (7).

Referring once more to FIG. 5, the logic flows from initialization block 514 to a state propagation step 518, which is part of time update block 516. In the following description, a ^ notation is used to denote filter estimates of the respective variables, and a superscript ⁻ represents a time update. Time propagation of the TUBA state vector in block 518 of FIG. 5 is performed by numerically integrating the state derivative vector from the previous time $t_{i-1}$ to the current time $t_i$ where the subscript i refers to the filter cycle iteration $$\hat{\underline{s}}(t_i)^- = \hat{\underline{s}}(t_{i-1}) + \int_{t_{i-1}}^{t_{i-1}+\Delta t} \hat{\underline{\dot{s}}}(\tau) d\tau \tag{19}$$

A $2^{nd}$ order Runge Kutta algorithm might be used for the integration process. The incremental time step, $\Delta t$, refers to either the nominal update cycle time or the incremental time step from the last cycle time to the current measurement time $t_M$ (i.e. $\Delta t = t_m - t_{i-1}$).

From state time propagation block 518, the logic of FIG. 5 flows to a block 520. Block 520 represents calculation of the state transition matrix for the extended TUBA Kalman filter algorithm. The Jacobian matrix corresponding to the state vector and dynamics described in equations (12) and (13) is $$J = \left[ \frac{\partial \dot{s}}{\partial s} \right] = \begin{bmatrix} \frac{\partial \underline{\dot{X}}}{\partial s} \\ \frac{\partial \underline{\ddot{X}}}{\partial s} \\ \frac{\partial K}{\partial s} \\ \frac{\partial delT}{\partial s} \\ \frac{\partial delA}{\partial s} \end{bmatrix} = \begin{bmatrix} 0_{3\times3} & I_{3\times3} & 0 & 0 & 0 \\ \frac{\partial \underline{\ddot{X}}}{\partial \underline{X}} & \frac{\partial \underline{\ddot{X}}}{\partial \underline{\dot{X}}} & \frac{\partial \underline{\ddot{X}}}{\partial K} & \frac{\partial \underline{\ddot{X}}}{\partial delT} & \frac{\partial \underline{\ddot{X}}}{\partial delA} \\ & & 0_{1\times9} & & \\ & & 0_{1\times9} & & \\ & & 0_{1\times9} & & \end{bmatrix} \tag{20}$$

where components of the Jacobian corresponding to $$\frac{\partial \underline{\dot{X}}}{\partial s}$$

are defined below in equations (21) to (26)

$$\frac{\partial \ddot{\underline{X}}}{\partial \underline{X}} = \frac{-\mu \hat{\underline{Z}}}{|\hat{\underline{Z}}|^3}[I_{3\times 3}] - \frac{3}{|\hat{\underline{Z}}|^2}\hat{\underline{Z}} \cdot \hat{\underline{Z}}' - [[\hat{\underline{\omega}}]] \cdot [[\hat{\underline{\omega}}]] \quad (21)$$

$$\frac{\partial \ddot{\underline{X}}}{\partial \dot{\underline{X}}} = -2 \cdot [[\hat{\underline{\omega}}]] \quad (22)$$

Note that the [[•]] notation denotes a skew symmetric matrix of the vector argument.

$$\frac{\partial \ddot{\underline{X}}}{\partial K}$$

and $$\frac{\partial \ddot{\underline{X}}}{\partial delT}$$

are performed numerically by choosing some small value for $\partial K$ and $\partial delT$. The resulting equations are $$\frac{\partial \ddot{\underline{X}}}{\partial K} = a1 + \hat{K} * \frac{a2-a1}{dk} \quad (23)$$

$$\frac{\partial \ddot{\underline{X}}}{\partial delT} = -\hat{K} * \frac{(a3-a1)}{dt} \quad (24)$$

where:
dk=0.001
dt=0.01
a1=BoostAccLookup (template_index)
a2=BoostAccLookup(template_index+(tInstage+dt)*dk)
a3=BoostAccLookup(template_index+dt)

The partial derivative of acceleration with respect to the error in angle of attack, $$\frac{\partial \ddot{\underline{X}}}{\partial delA},$$

is given by $$\frac{\partial \ddot{\underline{X}}}{\partial delA} = \hat{K} * BoostAccLookup(\text{template\_index}) * \partial \hat{\underline{T}} \quad (25)$$

where:

$$\partial \hat{\underline{T}} = \underline{yL2}^* \sin(AoaEst) - \underline{zL2}^* \cos(AoaEst) \quad (26)$$

The partial of $\hat{\underline{T}}$ is taken with respect to angle of attack only, since variations of the thrust vector with respect to position and velocity is minimal. $\hat{\underline{T}}$, AoaEst, yL2, and zL2 are defined in equations (18), (15), (16), and (17), respectively.

From Jacobian computation block 520 of FIG. 5 the logic flows to a block 522, representing the covariance propagation portion of the time update 516. The state transition matrix used for the time propagation of the TUBA error covariance can be approximated as $$\Phi \approx I + J\Delta t + \frac{J^2 \Delta t^2}{2} \quad (27)$$

Time propagation of the TUBA error covariance matrix P is performed with the equation $$P(t_i)^- = \Phi P(t_{i-1}) \Phi^T + Q_i \quad (28)$$

where:
Q is the 9×9 TUBA state noise matrix whose diagonal elements are chosen based on tuning considerations.

From covariance propagation portion or block 522 of time update 516 of FIG. 5, the logic flows to a Template Parameter Update block 524 and then to a Staging Logic Early Thrust Termination Block 542, both described in more detail below.

The logic of FIG. 5 arrives at a Gain Computation portion 528 of a Measurement Update block 526. The Kalman gain matrix is calculated in block 528 using the measurement matrix and the TUBA error covariance matrix $$K = P(t_i)^- \cdot H^T \cdot (H \cdot P(t_i)^- \cdot H^T + R)^{-1} \quad (29)$$

where:
H=[$I_{3\times 3} 0_{3\times 3} 0_{3\times 3}$]
H is the measurement matrix, and R is the measurement noise covariance matrix associated with the currently reporting sensor.

The logic flows from block 528 of FIG. 5 to a State Measurement Update block 530. State Measurement Update block 530 computes the measurement residuals and updates the TUBA state vector $$\hat{\underline{s}}_i = \hat{\underline{s}}_i^- + K \cdot (\underline{X}_m - H \cdot \hat{\underline{X}}_i^-) \quad (30)$$

Finally, the logic of FIG. 5 reaches the Covariance Measurement Update function 532, which performs the measurement update of the state covariance matrix $$P(t_i) = (I - K \cdot H) \cdot P(t_i)^- \quad (31)$$

and the logic returns to time update block 516, with updated time T=$T_m$+$\Delta t$ for the next calculation cycle, by way of a path 540.

Template Parameter Update block 524 of FIG. 5 updates the time index, template_index, used in the next filter update pass to look up the thrust acceleration and angle of attack. Template parameters tInstage and template_index are defined in equations (1) and (2), respectively, and were also described in conjunction with block 514 of FIG. 5. At each update after initialization, tInstage and template_index are updated $$t\text{Instage} = t\text{Instage} + \Delta t \quad (32)$$

where $\Delta t$ is the measurement update interval $$\text{template\_index} = (t\text{Instage} - \text{del}\hat{T}) * \hat{K} + \text{stageTimePast} \quad (33)$$

where stagetimepast is the nominal past stage.

Note that the initial error in tInstage due to the initial guess at the value of target time after launch is removed in the calculation of template_index via the filter state del$\hat{T}$, and the acceleration profile variation due to motor differences is corrected by the filter state $\hat{K}$.

The TUBA target staging and early thrust termination logic block 542 of FIG. 5 provides timely estimates of the target's burn times and detects when early thrust termination has occurred. Block 542 is not mandatory for estimating the states of a boosting target using nominal template profiles of target (a) thrust acceleration, (b) altitude, (c) speed, and (d) angle-of-attack as a function of time after launch, updated using the states of a filter to correct for template indexing error, template boost acceleration variations, and template angle-ofattack variations. However, the Staging Logic Early Thrust Termination block 542 can improve the accuracy of the target state estimation by providing timely transition to the ballistic phase.

If the target is still thrusting, the estimated burn time for the current stage is calculated in block 542 of FIG. 5 according to equation (34)

$$tBOEst = \frac{(stageTimeCurrent - stageTimePast)}{\hat{K}} + stageTimePastEst - offsetError + \frac{de\hat{l}T}{\hat{K}}$$

where:
stageTimeCurrent=nominal current stage burn out time
stageTimePast=nominal past stage burn out time
stageTimePastEst=estimated value of the previous stage burn out time
$\hat{K}$ and $de\hat{l}T$=state estimates from the filter
offsetError=initial difference between template_index and measured time.
Staging times for subsequent stages are updated relative to the current stage time estimate.

To account for the uncertainties in the estimated burn out time, a staging window (e.g. 3 to 4 seconds) is set on either side of the estimated current stage burn out time in block 542 of FIG. 5. If the target is within the staging window, the estimated burn out time is used to determine if the target has entered the next stage or has entered the ballistic phase. When a staging event has occurred, filter estimates for $\hat{K}$ and $del\hat{T}$ are reset to their initial values. The target stage number is incremented, and template timing parameters are reinitialized as $\hat{K}=1$ $del\hat{T}=0$ thisStage=thisStage+1 offsetError=stageTimeEstPast−tgtMeasTime $t$Instage=$tgt$MeasTime−stageTimeEstPast template_$time$=($t$Instage−del$\hat{T}$)*$\hat{K}$+stageTimePast (35)

where:
tgtMeasTime is current system time.

When the target has exited a staging window, the filter error covariance for K and delA are reset to their initial default values by the Staging Logic portion of block 542 of FIG. 5. When the target is ballistic, the error covariance for K, delT, and delA are all reinitialized to some small value, (e.g. 0.00000001).

Liquid-propellant rocket engines control the thrust by varying the amount of propellant that enters the combustion chamber. By stopping the flow of propellants into the combustion chamber, these targets can effectively terminate their thrust prior to the nominal end of boost time. Solid-propellant rockets are not as easy to control as liquid rockets. Once started, the propellants burn until they are gone. However, some solid-fuel engines have hatches on their sides that can be cut loose by remote control to release the chamber pressure and terminate thrust. Early thrust termination poses a particularly difficult problem for tracking since it is an unknown change in acceleration applied at an unknown time. If the filter continues to assume nominal boost acceleration when in actuality the rocket has early thrust terminated, potentially huge errors would result in the estimated states which might well render invalid any fire control solution. The early thrust termination logic portion of block 542 of FIG. 5 attempts to overcome this difficulty. More particularly, at 20 seconds (or at some other selected time) prior to the estimated final burn out time, TUBA increases the K covariance values and observes for changes in K estimates. At this point, the K factor has settled to the correct value reflecting the state of the rocket motor. Therefore, a sudden and consistent change in K can only be caused by a substantial change in the target's acceleration. Such a sudden, consistent change in K indicates that the target has early thrust terminated, and gives an indication of the time of thrust termination which can be used in the overall state estimates.

Figure 8:
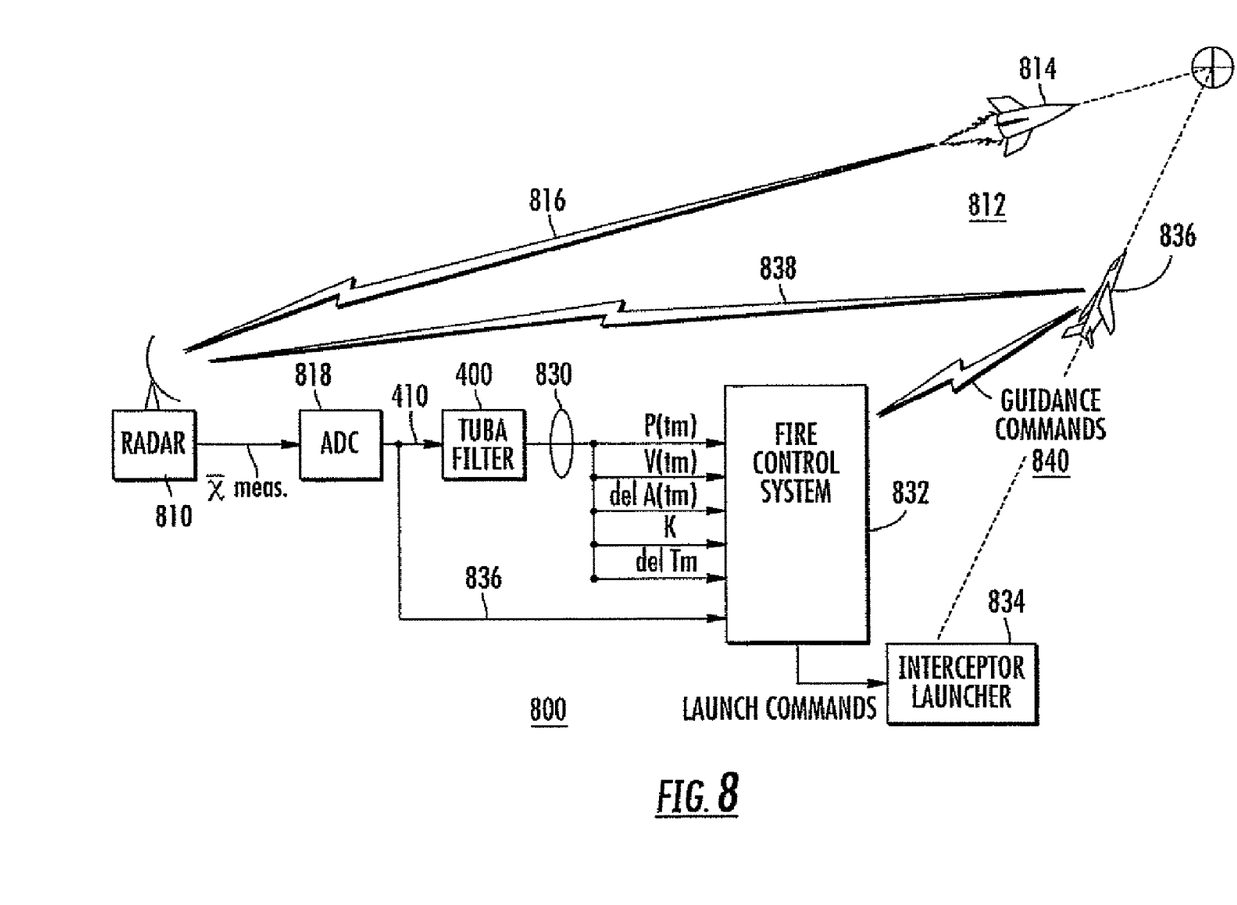
FIG. 8 is a simplified diagram of a missile detection and interceptor control system incorporating the arrangement of FIG. 4.

FIG. 8 is a simplified block diagram of a hostile missile detection and interceptor missile control system 800 according to an aspect of the invention. In FIG. 8, a radar system 810 surveys a region 812 for the purpose of detecting hostile missiles or targets. A boosting target is illustrated as 814, and is detected by electromagnetic radiation and reflection, illustrated together as a "lightning bolt" 816. The radar system 810 produces analog target-representative signals as known in the art. An analog-to-digital converter (ADC) illustrated as a block 818 converts the analog target-representative signals into digital form. The digital target-representative signals are applied from ADC 818 by way of path 410 to TUBA template updated boost state estimating arrangement 400, illustrated in more detail in FIG. 4. The TUBA template updated boost state estimating arrangement 400 operates as described in conjunction with FIGS. 4, 5, 6, and 7 to estimate the states of the target. The target position state $P(t_m)$, target velocity state $V(t_m)$, error $delA(t_m)$ in angle of attack, error delT in the time index into the template, and scalar (hot/cold) motor variation factor (K) outputs of boost state estimating arrangement 400 are applied by way of paths designated together as 830 to a weapon control system illustrated as a block 832. Weapon control system 832 receives the target position state $P(t_m)$, target velocity state $V(t_m)$, error $delA(t_m)$ in angle of attack, error delT in the time index into the template, and scalar (hot/cold) motor variation factor (K), and calculates the target acceleration generally as described in conjunction with equations (9) through (18). Weapon control system 832 uses the target position state $P(t_m)$, target velocity state $V(t_m)$, error $delA(t_m)$ in angle of attack, error delT in the time index into the template, and scalar (hot/cold) motor variation factor (K) and the calculated target acceleration to generate launch commands, as known in the art, for a launcher, illustrated as a block 834, for an interceptor missile 836. Once the interceptor missile 836 is launched, the radar 810 tracks the interceptor 836 as well as the target 814, as suggested by lightning bolt 838. Information relating to the location of the interceptor missile 836 in flight is passed from radar 810 to the weapon control system 832 by way of a path 836. Weapon control system 832 processes the interceptor missile location information together with the target state information to generate interceptor missile commands for application to the interceptor missile in flight, as suggested by lightning bolt 840. The interceptor missile 836 is guided to the target in the usual manner.

A method according to an aspect of the invention is for attacking a target (814) missile in its boost state. The method comprises the steps of sensing the target (814) and generating signals representative of the target (814) position. From the signals representative of the target (814) position, estimating the states of a boosting target (814) using nominal templates (300). The templates (300) comprise profiles of the target (814) (a) thrust acceleration, (b) altitude, (c) speed, and (d) angle-of-attack as a function of time after launch, all updated using the states of a filter (412) to correct for template indexing error, template boost acceleration variations, and template angle-of-attack variations, thereby producing estimated target (814) states unencumbered by motor burn boost variations and providing for accurate determination of end-of-boost. The target (814) states are applied determine target (814) acceleration, and the firing and guidance of an interceptor missile (836) are controlled (832) in response to the estimated target (814) states and the target (814) acceleration.

A method according to an aspect of the invention is for attacking a target (814) missile in its boost state. The method comprises the steps of sensing the target (814) and generating signals representative of the target (814) position. From the signals representative of the target (814) position, the state of a boost vehicle or target (814) is estimated. The estimated state includes position and velocity, and at least one of (a) variation in engine burn rate, (b) error in time after launch and (c) error in angle of attack. The method comprises the steps of (A) providing a template (300) characterizing nominal values of acceleration of the target (814) due to engine thrust, speed, altitude, and angle-of-attack, all as a function of time after target (814) launch, (B) calculating target (814) altitude from the target-position information to generate calculated target (814) altitude, (C) establishing a time index ($I_o$) by entering the template (300) at the calculated target (814) altitude ($Alt_o$), (D) reading from the template at least that nominal value of time after launch (TAL), acceleration ($AB_x$), speed ($V_x$), and angle of attack ($AOA_x$) corresponding to the calculated target (814) altitude, (E) initializing (514) both the state estimate and the associated covariances of an extended Kalman filter (412) with the nominal value of time after launch, acceleration, speed, and angle of attack corresponding to the calculated target (814) altitude, (F) propagating in time (516) the state estimates and covariances of the Kalman filter to generate a time-updated vector of state estimates representing the predicted state of the target (814), using at least one of the template profile information updated by (a) variation in engine burn rate, (b) error in time after launch and (c) error in angle of attack, (G) updating (526) the states using the measurements to produce a vector of measurement updated state estimates and covariances of the target (814), including position and velocity, and at least one of (a) variation in engine burn rate, (b) error in time after launch and (c) error in angle of attack, (H) applying the states (832) to determine target (814) acceleration, and controlling (832) the firing and guidance of an interceptor missile in response to the estimated states and the target (814) acceleration. In an advantageous mode of this method, the step of providing a template characterizing nominal values of acceleration of the target (814) comprises the step of providing a template characterizing nominal values of boost acceleration.

A method for attacking a target (814) missile in its boost state comprises the steps of sensing the target (814) and generating target-position information representative of the target (814) position. From the target-position information representative of the target (814) position, the state of the boosting target (814) is estimated by the steps of:
 providing a template (300) characterizing nominal values of acceleration of the target (814) as a function of time after target (814) launch;
 calculating target (814) altitude from the target-position information to generate calculated target (814) altitude;
 establishing a time index by entering the template (300) at the calculated target (814) altitude;
 reading from the template nominal value of at least one of (a) time after launch, (b) acceleration, (c) speed, and (d) angle of attack corresponding to the calculated target (814) altitude;
 initializing both the state estimate and the associated covariances of an extended Kalman filter (412) with the nominal value corresponding to the calculated target (814) altitude, to thereby generate state estimates and covariances of the Kalman filter;
 propagating in time the state estimates and covariances of the Kalman filter to generate a time-updated vector of state estimates representing the predicted state of the target (814), to thereby generate propagated target (814) states; and
 updating the propagated target (814) states using measurements, to produce a vector of measurement updated state estimates and covariances of the target (814).

The method for attacking a target (814) missile further comprises the steps of applying the updated state estimates and covariances to determine target (814) acceleration, and controlling (832) the firing and guidance of an interceptor missile in response to the updated state estimates and the target (814) acceleration. In a particular mode of this method, the step of providing a template characterizing nominal values of acceleration of the target (814) includes the step of providing a template characterizing nominal values of acceleration of the target (814) due to engine thrust, speed, altitude, and angle-of-attack, all as a function of time after target (814) launch. In another mode of this method, the step of reading from the template nominal value includes the step of reading from the template at least that nominal value of time after launch, acceleration, speed, and angle of attack corresponding to the calculated target (814) altitude, to thereby produce read nominal values. In this mode, the step of initializing both the state estimate and the associated covariances of an extended Kalman filter with the read nominal values includes the step of initializing both the state estimate and the associated covariances of an extended Kalman filter with the nominal value of time after launch, acceleration, speed, and angle of attack corresponding to the calculated target (814) altitude. In yet another mode of this method, the step of propagating in time the state estimates and covariances of the Kalman filter to generate a time-updated vector of state estimates representing the predicted state of the target (814) includes the step of propagating in time the state estimates and covariances of the Kalman filter to generate a time-updated vector of state estimates representing the predicted state of the target (814), using at least one of the template profile information updated by (a) variation in engine burn rate, (b) error in time after launch and (c) error in angle of attack. In a further mode of this method, the step of sensing at least the position of the target (814) further comprises the steps of (A) making measurements of the position of the target (814), and (B) the step of updating the propagated target (814) states includes the step of updating the target (814) states using the measurements to produce a vector of measurement updated state estimates and covariances of the target (814), including position and velocity, and at least one of (a) variation in engine burn rate, (b) error in time after launch and (c) error in angle of attack.

What is claimed is:
1. A method for attacking a target missile in its boost state, said method comprising the steps of
 sensing the target and generating signals representative of a target position,
 from said signals representative of the target position, estimating states of the boosting target using nominal tem- plates comprising profiles of (a) thrust acceleration, (b) altitude, (c) speed, and (d) angle-of-attack as a function of time after launch of said target, wherein all of said profiles are updated using states of a filter to correct for template indexing error, template boost acceleration variations, and template angle-of-attack variations, wherein the estimated target states are unencumbered by motor burn boost variations and provide accurate determination of an end-of-boost of said target, applying said target states to determine target acceleration, and controlling firing and guidance of an interceptor missile in response to said estimated target states and said target acceleration.

2. The method of claim 1, wherein the step of controlling firing and guidance of an interceptor missile further comprises processing a location of an interceptor missile together with target state information to generating interceptor missile commands for application to the interceptor missile in flight.

3. The method of claim 1, wherein said filter is a Kalman filter.

4. A method for attacking a target missile in its boost state, said method comprising the steps of sensing the target and generating signals representative of target position, from said signals representative of the target position, estimating a state of said target, including position and velocity, and at least one of (a) variation in engine burn rate, (b) error in time after launch and (c) error in angle of attack, said method comprising the further steps of:

providing a template representing nominal values of acceleration of said target due to engine thrust, speed, altitude, and angle-of-attack, as a function of time after target launch;

calculating target altitude from said target-position signals to generate a calculated target altitude;

reading from said template at least a nominal value of time after launch, acceleration, speed, and angle of attack corresponding to said calculated target altitude;

initializing the state estimate and associated covariances of a filter with said nominal value of time after launch, acceleration, speed, and angle of attack corresponding to said calculated target altitude;

propagating in time the state estimates and covariances of said filter to generate a time-updated vector of state estimates representing a predicted state of the target, using at least one of said template profile information updated by (a) variation in engine burn rate, (b) error in time after launch and (c) error in angle of attack;

updating said states using measurements to produce a vector of measurement updated state estimates and covariances of the target, including position and velocity, and at least one of (a) variation in engine burn rate, (b) error in time after launch and (c) error in angle of attack; and applying said states to determine target acceleration, and controlling firing and guidance of an interceptor missile in response to said estimated states and said target acceleration.

5. A method according to claim 4, wherein said step of providing a template representing nominal values of acceleration of said target comprises the step of providing a template representing nominal values of boost acceleration.

6. The method of claim 4, further comprising, subsequent to said step of calculating target altitude, establishing a time index by entering said template at said calculated target altitude.

7. A method for attacking a target missile in its boost state, said method comprising the steps of:

sensing the target and generating target-position information representative of the target position;

from said target-position information representative of the target position, estimating a state of a boosting target by the steps of:

providing a template representing nominal values of acceleration of said target as a function of time after target launch;

calculating target altitude from said target-position information to generate calculated target altitude;

reading from said template nominal value of at least one of (a) time after launch, (b) acceleration, (c) speed, and (d) angle of attack corresponding to said calculated target altitude;

initializing the state estimate and associated covariances of filter with said nominal value corresponding to said calculated target altitude, to thereby generate state estimates and covariances of said filter;

propagating in time the state estimates and covariances of said filter to generate a time-updated vector of state estimates representing said predicted state of the target, to thereby generate propagated target states; and updating said propagated target states using measurements, to produce a vector of measurement updated state estimates and covariances of the target; said method for attacking a target missile further comprising the steps of:

applying said updated state estimates and covariances to determine target acceleration, and controlling the firing and guidance of an interceptor missile in response to said updated state estimates and said target acceleration.

8. A method according to claim 7, wherein said step of providing a template representing nominal values of acceleration of said target includes the step of providing a template representing nominal values of acceleration of said target due to engine thrust, speed, altitude, and angle-of-attack, all as a function of time after target launch.

9. A method according to claim 7, wherein said step of reading from said template nominal value includes the step of reading from said template at least that nominal value of time after launch, acceleration, speed, and angle of attack corresponding to said calculated target altitude, to thereby produce read nominal values.

10. A method according to claim 9, wherein said step of initializing both the state estimate and the associated covariances of a filter with said read nominal values includes the step of initializing both the state estimate and the associated covariances of the filter with said nominal value of time after launch, acceleration, speed, and angle of attack corresponding to said calculated target altitude.

11. A method according to claim 7, wherein said step of propagating in time the state estimates and covariances of said filter to generate a time-updated vector of state estimates representing said predicted state of the target includes the step of propagating in time the state estimates and covariances of said filter to generate a time-updated vector of state estimates representing said predicted state of the target, using at least one of said template profile information updated by (a) variation in engine burn rate, (b) error in time after launch and (c) error in angle of attack.

12. A method according to claim 7, wherein:

said step of sensing at least the position of said target further comprises the step, of:

making measurements of the position of said target; and said step of updating said propagated target states includes the step of updating said target states using the measurements to produce a vector of measurement updated state estimates and covariances of the target, including position and velocity, and at least one of (a) variation in engine burn rate, (b) error in time after launch and (c) error in angle of attack.

13. The method of claim 7, further comprising, subsequent to said step of calculating target altitude, establishing a time index by entering said template at said calculated target altitude.

14. The method of claim 4, wherein said filter is an extended Kalman filter.

15. The method of claim 7, wherein said filter is an extended Kalman filter.

16. A ballistic missile detection and defense system, comprising:

a missile detection system for estimating at least a time after launch of a ballistic missile;

a missile tracking system for receiving said time after launch from said missile detection system, and for estimating a state of said missile in flight, said missile tracking system comprising at least one nominal profile template of missile (a) altitude, (b) speed, and (c) angle-of-attack as a function of said time after launch; and a comparator for comparing said state of said missile in flight with said at least one nominal profile template, and, if a match is found, identifying that missile on which said matching nominal profile is based.

17. The system of claim 16, further comprising an updated boost state estimator for estimating states of the target.

18. The system of claim 17, wherein the state of the target include at least one of target position, target velocity, error in angle of attack, error in time index into the template, and scalar motor variation factor.

19. The system of claim 16, further comprising a weapon control system for receiving information regarding the state of said missile and generating launch commands based on said information.

20. The system of claim 19, further comprising an interceptor launcher for receiving said launch commands from said weapon control system and launching an interceptor missile.

\* \* \* \* \*